United States Patent
Behrens et al.

(10) Patent No.: US 11,928,737 B1
(45) Date of Patent: Mar. 12, 2024

(54) METHODS AND APPARATUS TO PROCESS INSURANCE CLAIMS USING ARTIFICIAL INTELLIGENCE

(71) Applicant: STATE FARM MUTUAL AUTOMOBILE INSURANCE COMPANY, Bloomington, IL (US)

(72) Inventors: Mercy Behrens, Bloomington, IL (US); Jason Beckman, Bloomington, IL (US); Donald Joseph Yuhas, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 16/420,693

(22) Filed: May 23, 2019

(51) Int. Cl.
*G06Q 40/08* (2012.01)
*G06F 40/30* (2020.01)
*G06N 20/00* (2019.01)
*G06Q 10/10* (2023.01)

(52) U.S. Cl.
CPC ............. *G06Q 40/08* (2013.01); *G06F 40/30* (2020.01); *G06N 20/00* (2019.01); *G06Q 10/10* (2013.01)

(58) Field of Classification Search
CPC ............. G06Q 40/08; G06Q 10/06316; G06Q 10/0633
See application file for complete search history.

(56) References Cited

U.S. PATENT DOCUMENTS

| | | | |
|---|---|---|---|
| 8,082,294 B2 | 12/2011 | Krahulec et al. | |
| 8,095,393 B2 | 1/2012 | Seifert et al. | |
| 8,996,394 B2 * | 3/2015 | Nores | G06Q 10/063 705/7.11 |
| 9,886,841 B1 * | 2/2018 | Nave | G06F 30/20 |
| 9,947,202 B1 * | 4/2018 | Moon | G06Q 40/08 |
| 10,217,170 B2 * | 2/2019 | Edwards | G06Q 10/063116 |
| 10,453,145 B2 * | 10/2019 | Lawlor | G06Q 30/0283 |
| 10,484,542 B1 * | 11/2019 | Rager | H04M 3/42382 |
| 10,497,250 B1 * | 12/2019 | Hayward | G06Q 40/08 |

(Continued)

FOREIGN PATENT DOCUMENTS

WO    WO2009136795 A1    11/2009

OTHER PUBLICATIONS

Mitul Makadia, How AI Enables Smarter Claims Processing & Fraud Detection?, May 2, 2019, towardsdatascience.com (Year: 2019).*

(Continued)

*Primary Examiner* — Karen A Hranek
(74) *Attorney, Agent, or Firm* — Lee & Hayes, P.C.

(57) ABSTRACT

Example methods, apparatus, and articles of manufacture to process insurance claims using artificial intelligence are disclosed herein. An example computer-implemented method, executed by a processor, to process an insurance claim using artificial intelligence includes interacting, with the processor, electronically with at least one of an insured person, a representative of the insured person, or a representative of an insured entity to obtain information related to an insurance claim, processing, with the processor, the information with a machine learning engine to identify an action to be taken for the insurance, and performing, with the processor, the action using a backend processing module that is also used by a person to process an insurance claim.

17 Claims, 5 Drawing Sheets

(56) References Cited

U.S. PATENT DOCUMENTS

| | | | |
|---|---|---|---|
| 10,783,585 B1* | 9/2020 | Banerjee | G06Q 40/08 |
| 11,151,577 B2* | 10/2021 | Chan | G06Q 10/06316 |
| 2009/0240531 A1 | 9/2009 | Hilborn | |
| 2009/0287509 A1* | 11/2009 | Basak | G06Q 10/10 |
| | | | 705/4 |
| 2010/0138243 A1 | 6/2010 | Carroll | |
| 2010/0145734 A1 | 6/2010 | Becerra et al. | |
| 2012/0143634 A1* | 6/2012 | Beyda | G06Q 10/06 |
| | | | 705/4 |
| 2012/0179496 A1* | 7/2012 | Wargin | G06Q 30/0225 |
| | | | 705/4 |
| 2012/0323827 A1* | 12/2012 | Lakshmanan | G06N 7/005 |
| | | | 706/12 |
| 2013/0124223 A1 | 5/2013 | Gregg | |
| 2014/0081675 A1* | 3/2014 | Ives | G06Q 40/08 |
| | | | 705/4 |
| 2014/0324759 A1* | 10/2014 | Bonnard | G06Q 10/0633 |
| | | | 706/52 |
| 2015/0170288 A1 | 6/2015 | Harton et al. | |
| 2016/0063560 A1 | 3/2016 | Hameed et al. | |
| 2016/0117778 A1* | 4/2016 | Costello | G06Q 40/08 |
| | | | 705/4 |
| 2016/0140304 A1 | 5/2016 | Myers, Jr. et al. | |
| 2016/0371785 A1* | 12/2016 | Bray | G06Q 30/0631 |
| 2017/0161372 A1 | 6/2017 | Fern et al. | |
| 2017/0286607 A1* | 10/2017 | Magnuson | G06Q 10/10 |
| 2017/0352105 A1 | 12/2017 | Billings | |
| 2019/0012094 A1 | 1/2019 | Li et al. | |
| 2019/0012904 A1* | 1/2019 | Yusuf | A62B 17/003 |
| 2019/0108915 A1* | 4/2019 | Spurlock, III | G16H 50/70 |
| 2019/0317803 A1* | 10/2019 | Maheshwari | G06N 20/00 |
| 2019/0370369 A1 | 12/2019 | Kulkarni | |
| 2020/0027045 A1* | 1/2020 | Saarenvirta | G06Q 10/06313 |
| 2020/0320636 A1* | 10/2020 | Navarra | G06F 40/151 |
| 2020/0364797 A1* | 11/2020 | Halpern-Manners | |
| | | | G06N 20/00 |
| 2023/0316412 A1 | 10/2023 | Behrens | |

OTHER PUBLICATIONS

"Enabling Integrated Claims Management," Cognizant 20-20 Insights. Retrieved from https://www.cognizant.com/InsightsWhitepapers/Enabling-Integrated-Claims-Management.pdf, May 2012, 6 pages.

Mauri, "How an insurance claims web app can enhance your business," Mugo Web. Retrieved from https://www.mugo.ca/Blog/How-an-insurance-claims-web-app-can-enhance-your-business, Dec. 2017, 6 pages.

O'Connor, "Mobile Development Platform: The 4-Tier Architecture for Success," Progress.com. Retrieved from https://www.progress.com/blogs/mobile-development-platform-4-tier-architecture-for-success, Jan. 2017, 13 pages.

Non Final Office Action dated May 20, 2020 for U.S. Appl. No. 16/455,533 "Methods and Apparatus to Process Insurance Claims Using Cloud Computing" Behrens, 17 pages.

Office Action for U.S. Appl. No. 16/455,533, dated Dec. 9, 2021, Behrens, "Methods and Apparatus to Process Insurance Claims Using Cloud Computing", 24 Pages.

Rao, "A Strategist's Guide to Artifical Intelligence", strategy + business, Issue 87, Summer 2017, 12 pages.

Wikipedia, "Cloud computing", retrieved at <<https://enwikipedia.org/w/index.php?title=Cloud_computing&direction=next&oldid=826929965>>, 2018, 22 pgs.

Wikipedia, "Frontend and backend", retrieved at <<https://en.wikipedia.org/w/index.php?title=Frontend_and_backend&oldid=842612738>>, 2018, 4 pgs.

Final Office Action dated Oct. 7, 2020 for U.S. Appl. No. 16/455,533, "Methods and Apparatus to Process Insurance Claims Using Cloud Computing", Behrens, 20 pages.

Office Action for U.S. Appl. No. 16/455,533, dated Apr. 20, 2022, Behrens, "Methods and Apparatus to Process Insurance Claims Using Cloud Computing", 24 Pages.

Sing, et al., "Automating Car Insurance Claims Using Deep Learning Techniques", 2019 IEEE Fifth International Conference on Multimedia Big Data (BigMM) Singapore, doi:10,1109/BigMM.2019.00-25, 2019, pp. 199-207.

* cited by examiner

METHODS AND APPARATUS TO PROCESS INSURANCE CLAIMS USING ARTIFICIAL INTELLIGENCE

FIELD OF THE DISCLOSURE

This disclosure relates generally to insurance claim processing, and, more particularly, to methods, apparatus and articles of manufacture to process insurance claims using artificial intelligence (AI)

BACKGROUND

Conventional insurance claims processing involves one or more human claim adjusters (e.g., processors, handlers, etc.) speaking with an insured person or entity about their insurance claim. Based on those conversations and submitted document(s), the claim adjuster(s) manually process the insurance claim.

The figures depict embodiments of this disclosure for purposes of illustration only. One skilled in the art will readily recognize from the following discussion that alternate embodiments of the structures and methods illustrated herein may be employed without departing from the principles set forth herein.

In general, the same reference numbers will be used throughout the drawing(s) and accompanying written description to refer to the same or like parts. The figures are not to scale. Connecting lines or connectors shown in the various figures presented are intended to represent example functional relationships and/or physical or logical couplings between the various elements.

DETAILED DESCRIPTION

Manual insurance claim processing can be labor and time intensive, and costly to perform. For example, by relying on people to perform insurance claim processing, insurance companies need to employ large numbers of people to field claim inquiries and process claims. Further, insured persons can be frustrated by delays, and having to speak with multiple, different claim adjusters. Further still, because insured persons often have to speak with different claim adjusters, insured persons are often uncertain regarding the status of their claim. Moreover, many call centers are not open 24 hours a day, 7 days a week ("24/7"), making it difficult for some insured persons to reach an open call center. Even further, manual claim processing often does not take advantage of more flexible electronic communication methods such as chat, messaging, electronic mail, etc. that can enable an insured person to handle their claim on their schedule.

Example methods, apparatus and articles of manufacture to process claims using artificial intelligence are disclosed herein that overcome some or all of the above challenges, and/or other challenges associated with manual claim processing. For example, disclosed examples can lead to exponential decreases in phone calls, and decreases in claim processing times. Customer interactions can better leverage digital engagements, electronic communications, etc. (e.g., chat, text messages, electronic mail (email), etc.) that allow insured persons to handle their claim, get questions answered, be educated, etc. 27/4 on their schedule and from any location, thereby, enabling the insured person to be in control of their claim, and to provide requested information. By using an AI claim handler (described below), dependence on call centers to manually submit, handle, and check on the status of claims is greatly reduced. Additionally, the AI claim handler handles most of the interactions with an insured person, thereby, reducing or eliminating claim adjuster handoffs, thereby decreasing frustration on the part of the insured person. Further, the AI claim handler can handle a claim from end-to-end (e.g., first-notice-of-loss (FNOL) to claim closed), is not dependent on calendars, and is not restricted to fixed rules and, thus, can be proactive. Accordingly, use of the AI claim handler enables time previously spent by human claim adjusters to handle mundane tasks to be reduced or eliminated, thereby freeing human claim adjusters to focus on decision making, difficulty providing information, escalation of an issue, customer engagement, sympathy, comfort, etc.

Reference will now be made in detail to non-limiting examples, some of which are illustrated in the accompanying drawings.

Figure 1:
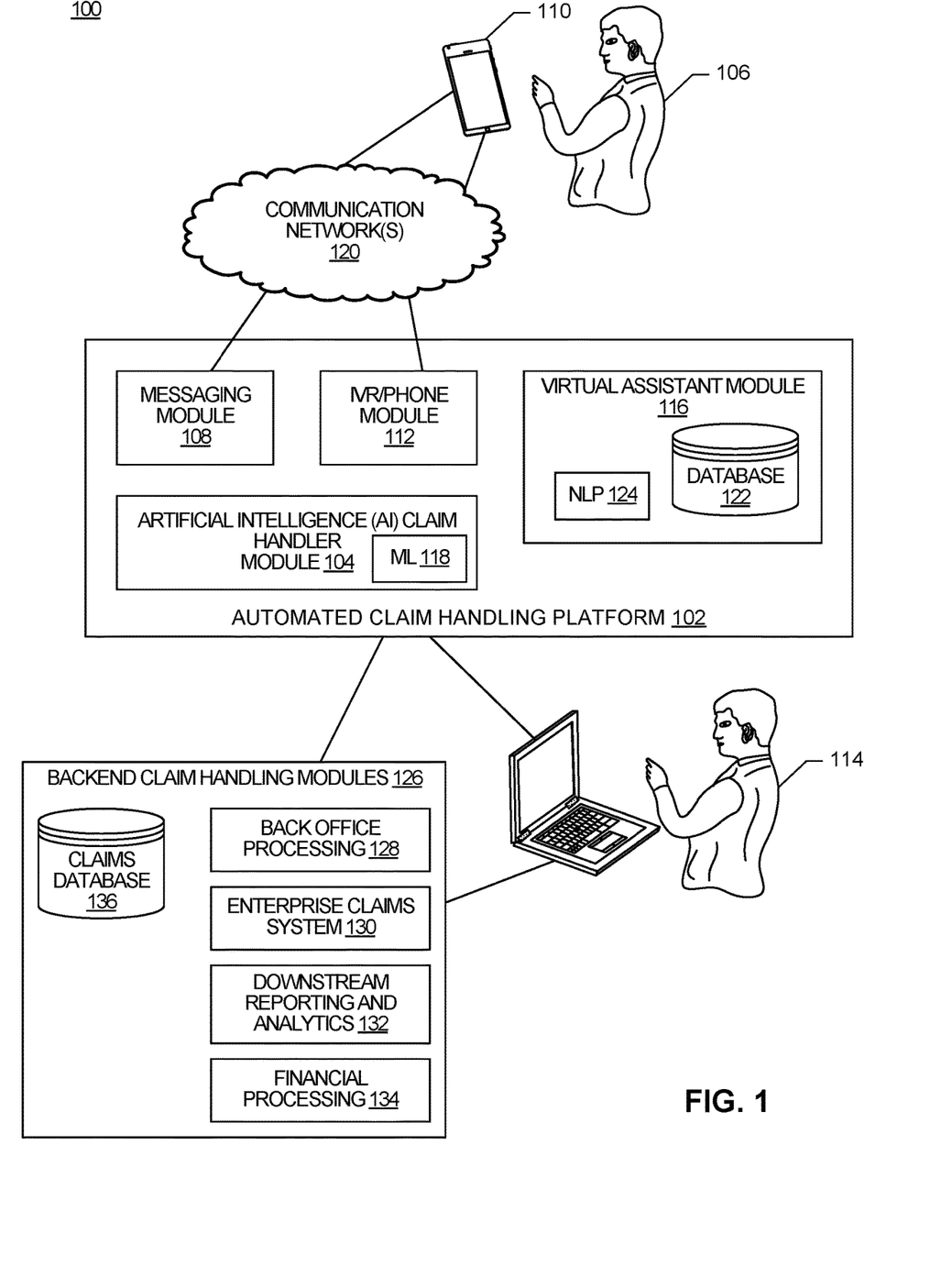
FIG. 1 is a block diagram of an example claim processing system to process insurance claims using artificial intelligence, in accordance with teachings of this disclosure.

FIG. 1 is a diagram of an example claim processing system 100 to, among possibly other things, process insurance claims using AI. To process insurance claims using AI, the example claim processing system 100 includes an example automated claim handling platform 102. The automated claim handling platform 102 is a connected intelligence platform. The automated claim handling platform 102 uses machine learning to take actions and make decisions to advance claim processing supported by humanlike interactions with insured persons with whom the automated claim handling platform 102 is communicating in a manner with which the insured persons find natural.

The automated claim handling platform 102 includes an AI claim handler module 104, and any number or type(s) of interfaces to enable the AI claim handler module 104 to electronically interact with an insured person 106, entity, customer or, equivalently herein, a representative thereof. Example interfaces include, but are not limited to: a messaging module 108 to interact with a device 110 (e.g., a tablet, a smartphone, a computer, etc.) associated with the insured person 106 via, for example, chat, electronic mail message, text messages, etc.; an interactive voice response (IVR)/phone module 112 to interact with the insured person 106 via a telephone (e.g., the device 110); an answering machine, etc.

The AI claim handler module 104 operates automatically (i.e., without human involvement) and proactively to process claims from a FNOL to claim resolution or closure. The AI claim handler module 104 applies machine learning to proactively: determine how/when to automatically and continuously monitor the state of a claim; when an action needs to be taken; and when it is necessary to interact with the insured person 106 to progress processing of the claim or provide timely, personalized status updates. As/when appropriate, the AI claim handler module 104 can escalate an issue to a human claim adjuster or operator 114. The AI claim handler module 104 can also involve the human claim adjuster or operator 114 when, for instance, a virtual assistant module 116 determines that interaction with an actual human claim adjuster or operator 114 would be beneficial. For example, the insured person 106 is using words, expressions, tone of voice, etc. that may be indicative of frustration, confusion, anger, etc. For example, a decision may be needed that is outside the scope of the AI claim handler module 104, the AI claim handler module 104 may not have a sufficient decision confidence for a decision, etc.

Being based on machine learning, the AI claim handler module 104 is not tied to strict or defined rules, but can simultaneously consider all claim facts, past information, past actions, current information, current state, change of state, time passage, related business event, etc. and take a dynamic decision regarding what action(s) need to be taken. This ability to consider, at once, all the facts, information and consideration of an insurance claim is beyond the ability of human claim adjusters. In this way, the AI claim handler module 104 can move forward in the absence of activity, can anticipate a customer need, can initiate action rather than be beholden to a fixed timeline, use time based triggers, etc. By using machine learning, the AI claim handler module 104 can learn from multitudes (e.g., thousands or millions) of prior insurance claims the basics and nuances of claim processing, procedures, workflows, best practices, etc. Moreover, the AI claim handler module 104 provides personalized recommendations and tailors the insured's experience based on all available pertinent information for the insurance claim. In some examples, the AI claim handler module 104 includes one or more script-based decisions. In some examples, the AI claim handler module 104 does not implement fixed, automated functions such as autopay.

In some examples, during an FNOL, the automated claim handling platform 102, while the insured person 106 is at an accident scene, (a) educates the insured person 106 on the claim handling process, (b) works with the insured person 106 to capture relevant information, (c) initiates the capture of photos of the damage, (d) provides a message to start digital processing of the claim before engaging human adjusters, (e) determines if estimatic claim processing (e.g., automated damage estimation) is appropriate, (f) automates the obtaining of a rental car, etc.

In some examples, post an FNOL (e.g., during claim processing), the automated claim handling platform 102 (g) gathers and evaluates all claim information, recommends liability determination, and prompts associate decisions, (h) continuously engages the insured person 106 to provide reminders, (i) interacts with the insured person 106 through text messaging, chat or email to check status or get updates, (j) provides timely snapshots to the insured person 106 that include status updates and action items, (k) provides tailored guidance and just in time training to educate the customer and set expectations for next steps, (l) pushes the insured person toward self-service via chat, text messaging, email, etc. offers to reduce follow-up phone calls, (m) facilitates third party interactions through self-service portals for repair, rental and other insurance company (OIC) for claim updates, payment status or actions, (n) provides human claim adjusters with a single page view of a claim's key information and the ability to take action, (o) enables human claim adjusters to push messages in the moment to provide an enhanced customer experience, and (p) provides a contemporary and efficient workflow that alerts to potential breaches, highlights claims with high cycle time, and provides an overall view of interactions.

The automated claim handling platform 102 can gather and evaluate all claim information, recommend liability determination, and prompt human claim adjuster decisions by, for example, reviewing all prior events, interactions, claim documentation, and any other information or activity on the claim as a basis for determining the current state of the claim, comparing the state of the claim to where the claim should be, and determining the next action needed on the claim to move it towards desired state or resolution. As an example, this could entail the automated claim handling platform 102 observing that liability has not been established, ordering a police report, interrogating the police report to recommend a liability decision, presenting the recommendation via prompt to a human claim handler for evaluation and liability determination, and waiting for a trigger around established liability to re-evaluate claim and determine next steps.

The automated claim handling platform 102 can provide timely snapshots to the insured person 106 that include status updates and action items by, for example, providing a summary of activities completed on the claim either by the insured person 106 or by the company, and providing a summary of tasks and next steps that are required or suggested. This includes providing relevant education or help messages to inform the customer on the claims process.

Figure 2:
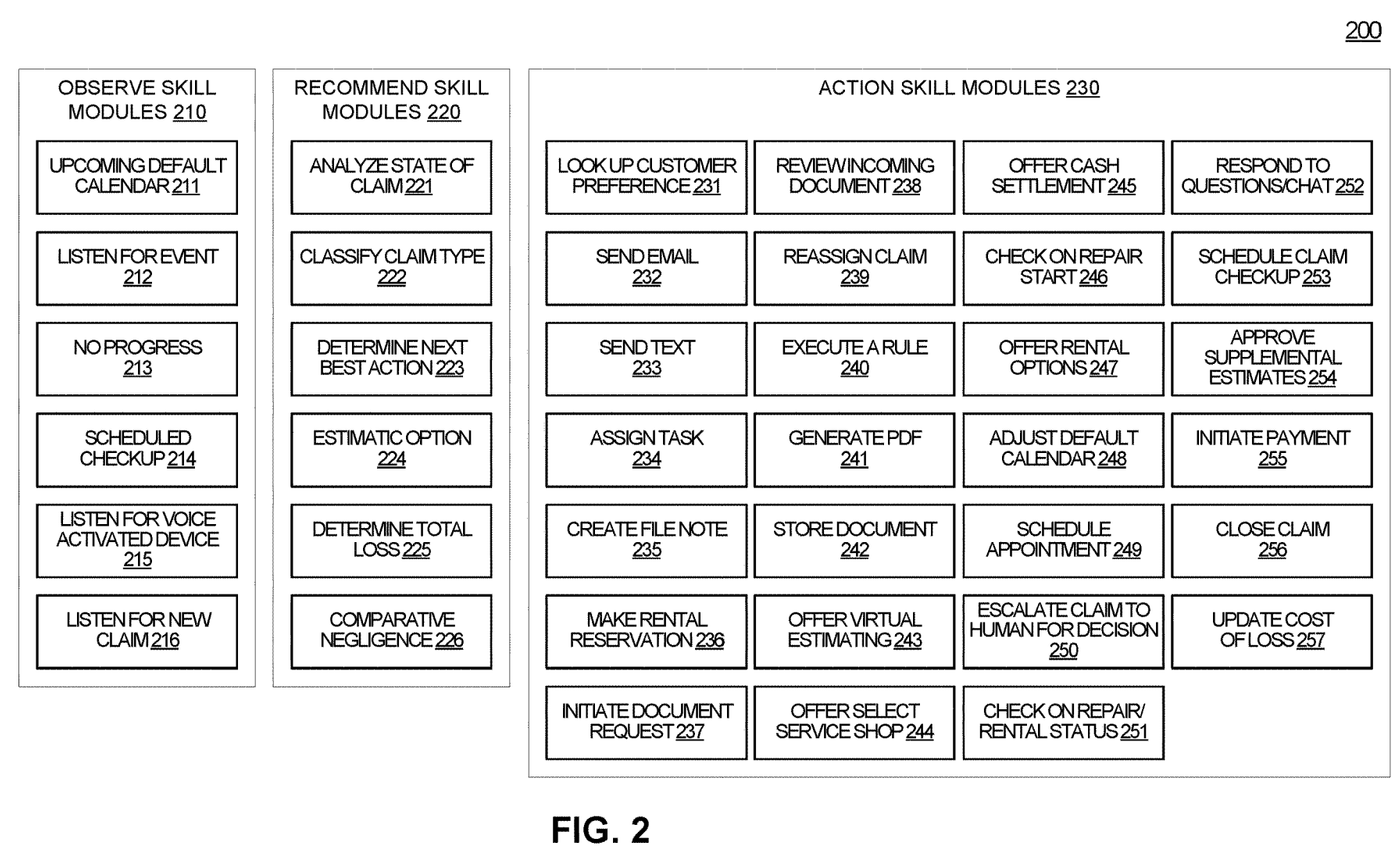
FIG. 2 is a diagram depicting an example set of skill modules that can be used to implement the AI claim handler module of FIG. 1.

The automated claim handling platform 102 can provide human claim adjusters with a single page view of a claim's key information and the ability to take action by, for example, providing a summary view to the claim handler highlighting prior activity on the claim, recent activity, and outstanding items needing human claim adjuster attention or action. For example, the summary may highlight that liability has been established, shop selection has been completed, an estimate has been received, EFT information from the customer is pending, interaction information details the customer has abandoned the EFT set up process mid-stream with a chat session started but not completed, and a rental offer was provided but a rental selection was not made In some examples, the AI claim handler module 104 includes a machine learning engine 118 (e.g., a neural network, the Azure™ Machine Learning service, a gradient boosting machine, etc.) to determine next steps/actions/skills/etc. to perform based on the processing status of an insurance claim. In some examples, claim processing actions taken for previous claims are used to train or update the machine learning engine 118. The machine learning engine 118 can be trained using unsupervised or supervised learning. In some examples, decisions made by the machine learning engine 118 are used to further train or update the machine learning engine 118.

In some examples, inputs of the machine learning engine 118 includes a vector of all data available for an insurance claim (e.g., dates, status, completions, information, insured person information, type of claim, etc.), and outputs of the machine learning engine 118 indicate which actions (e.g., which of the example skills of FIG. 2 should be performed). The inputs and outputs for previously processed claims (e.g., manual or automatic) can be used to train the machine learning engine 118 using unsupervised or supervised learning. In this way, the machine learning engine 118 can learn new claim processing processes. In some examples, some actions are scripted. For example, copies of all messages are stored in a record of the claim processing of an insurance claims.

The messaging module 108 and the IVR/phone module 112 can communicate with the device 110, or other devices associated with the insured person 106 via any number or type(s) of communication network(s) 120. The communication network(s) 120 include, but are not limited to, the Internet, a local area network (LAN), a metropolitan area network (MAN), a wide area network (WAN), a landline telephone network, a voice over Internet protocol (VoIP) network, a wired network, a Wi-Fi® network, a cellular network, a coaxial cable network, a wireless network, a private network, a virtual private network (VPN), a satellite network, etc.

The automated claim handling platform 102 includes any number or type(s) of virtual assistant modules, one of which is designated at the reference numeral 116, that enable the AI claim handler module 104 to interact with the insured person 106 as if the AI claim handler module 104 were an actual person, thereby delivering an engaging, human like, and personalized experience. When the AI claim handler module 104 needs to communicate information to the insured person 106, the AI claim handler module 104 provides to the virtual assistant module 116 the information to be conveyed, and the virtual assistant module 116 forms one or more messages (email, chat messages, text message, voice message, etc.) and conveys them via the communication network(s) 120. For example, reminder messages may be sent to remind an insured person that they still need to handle something, a status message to inform the insured person that the state of their claim has changed, etc. Likewise, when the AI claim handler module 104 needs to obtain information from the insured person 106, the AI claim handler module 104 specifies to the virtual assistant module 116 the information to be obtained, and the virtual assistant module 116 forms one or more request messages (email, text message, voice message, etc.) and conveys them via the communication network(s) 120. When, one or more messages (email, chat messages, text message, voice message, etc.) are received from the insured person 106, the virtual assistant module 116 interprets the messages and conveys the content to the AI claim handler module 104. In some examples, the virtual assistant module 116 accesses a database 122 that stores example phrases, expressions, utterances, intents, etc. corresponding to types of messages to be sent or received. In some examples, the virtual assistant module 116 includes a natural language parser (NLP) 124 to parse received messages into phrases, expressions, utterances, etc. that can be translated using the database 122 into, for example, intents of the insured person 106 for processing by the AI claim handler module 104.

In some examples, the virtual assistant module 116 enables, for example, repair facilities, human claim adjusters or operators, claimants, other parties, etc. to interact with, for example, backend claim handling modules 126.

Because the AI claim handler module 104, the virtual assistant module 116, the messaging module 108, and the IVR/phone module 112 are available for use 24/7, the insured person 106 can interact 24/7 with the AI claim handler module 104 to process their insurance claim, have questions answered, receive information (e.g., educational), provide information, check status, etc. on their schedule, from any location, and using their preferred communication method(s). The AI claim handler module 104 is perceived by an insured as a sleepless claim processor that is the entity handling their insurance claim from start to finish, unless the claim needs to be escalated to a human claim adjuster for decision making, for complex claims, to provide empathy or compassion during a hard time, to handle a frustrated insured person, to help an insured person having difficulty using the AI claim handler module 104, etc.

In at least these ways, the AI claim handler module 104 and, more generally, the automated claim handling platform 102 will be perceived as timely, personal and natural. And, together with the virtual assistant module 116, are more than a mere chatbot, as the AI claim handler module 104 can take actions based on the totality of the information for a claim, and progresses claim handling based on the same.

The automated claim handling platform 102 accesses backend claim handling modules 126, such as a back office processing module 128, an enterprise claims system module 130, a downstream reporting and analytics module 132, a financial processing module 134, and a claims database 136. In some examples, the backend claim handling modules 126 are the same modules that the human claim adjuster 114 accesses to process claims. Accordingly, the backend claim handling modules 126 can be reused by the automated claim handling platform 102, and enable the same claim to be processed by the automated claim handling platform 102 and the claim adjuster 114. Moreover, the same application programming interface (API) may be used by the automated claim handling platform 102 and the claim adjuster 114 to access the backend claim handling modules 126.

The back office processing module 128 handles manual claim handling activities, such as escalating claims to human claim adjusters 114 for decision and validation. For example, the back office processing module 128 may recommend human manual decision for liability determination, "stuck" claim needing human intervention to resume, chatbot/virtual assistant escalation to human due to complex question or sentiment analysis trigger, such as an upset customer, etc.

The enterprise claims system module 130 handles claims processes and automation required to enable execution of a claim. This includes interfaces for capturing, updating, and changing information or actions within the claims lifecycle. Includes other policy lifecycle related solutions necessary to manage a customer across an insurance company for purchasing, billing, and customer management.

The downstream reporting and analytics module 132 provides solutions leveraged to analyze and report on all aspects of claims processes across customer interactions, operations, claim outcomes, etc. this includes accounting & reporting, operational reporting, analytical reporting, and loss history for underwriting/actuarial systems, or any other reporting, feeds, etc. that reflect on the status of a claim, or what decisions/payments were made on the claim, but are not essential to the direct handling of a given claim.

The financial processing module 134 handles financial reporting and tracking within an insurance/financial services organization. This includes issuing payments, recovery, and disputes (sub, arbitration, etc.), and might also handle financial processing for third party providers, such as consolidated payments to a repair facility.

FIG. 2 is an example set of skill modules 200 that can be used to implement the AI claim handler module 104 of FIG. 1 or, more generally, the example automated claim handling platform 102 of FIG. 1. The example set of skill modules 200 includes an example set 210 of observe skill modules 211-216, an example set 220 of recommend skill modules 221-226, and an example set 230 of action skill modules 231-257. When an observe skill module 211-216 observes (e.g., detects, is triggered, etc.) by an event, information, etc., the observe skill module 211-216 selects one or more corresponding recommend skill modules 221-226 to perform in response to the observed event, information, etc. The observe skill modules 211-216 can consideration information obtained from the insured person 106 or previously obtained other claim processing modules (e.g., the backend claim handling modules 126) of the claim processing system 100. The recommend skill module(s) 221-226 select and perform one or more of the action skill modules 231-257 to carry out the selected recommend skill module(s) 221-226. The skill modules 200, 210-216, 220-226 and 230-257 can implement dynamic reminders, engage with customers digitally, progress claims, re-evaluate claims, perform intelligent calendaring, perform smart estimating (e.g., determine when automated photo-based claim processing is appropriate), perform claim lifecycle management, etc. In some examples, a confidence level is determined for each skill module selection that represents the likelihood the selection is the correct selection. If the confidence level is too low, the AI claim hander module 104 can route the insurance claim to the claim adjuster 114 for review, and then the AI claim handler module 104 can resume processing the insurance claim. The skill modules 200, 210-216, 220-226 and 230-257 can have metadata, can be searchable, can be selected from an inventory of skill modules, can be chained or sequenced together, and can be composed of other skill modules. Thus, through continual observing, recommending, and acting using the example skill modules 200, 210-216, 220-226 and 230-257 of FIG. 2, the AI claim handler module 104 can handle all aspects of an insurance claim.

Figure 3:
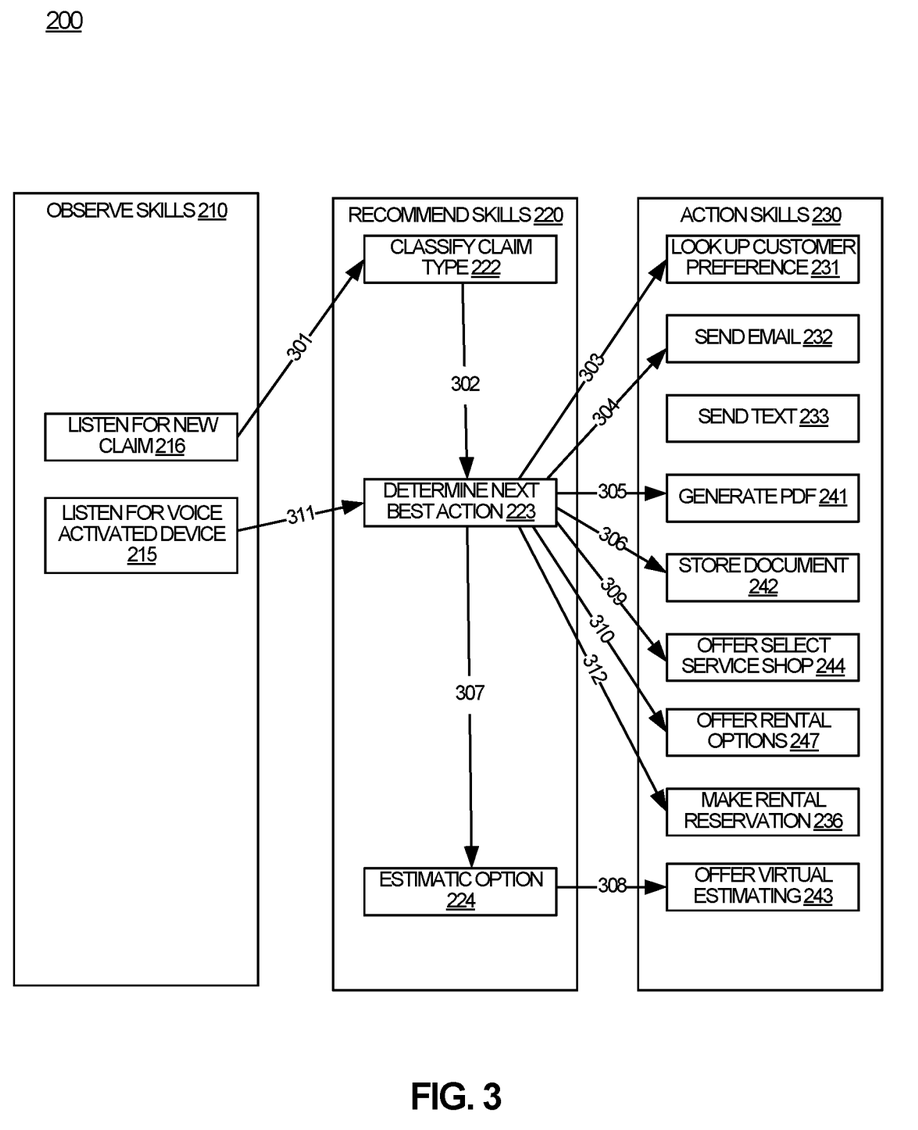
FIG. 3 is a diagram depicting example operations of the AI claim handler module of FIG. 1 based on the set of skill modules of FIG. 2.

For example, as depicted in FIG. 3, if the observe "new claim event" skill module 216 detects a new insurance claim, the observe "new claim event" module skill 216 triggers (line 301) the recommend "classify claim type" skill module 222 to classify the claim type. The recommend "classify claim type" skill module 222 triggers (line 302) the recommend "determine next best action" skill module 223. The recommend "determine next best action" skill module 223, in turn, (a) triggers (line 303) the action "look up customer preference" skill module 231 to determine how an insured person prefers to receive information, (b) triggers (line 304) one of the action "send email" skill module 232 or the action "send text" skill module 233 to send a "new claim notification," (c) triggers (line 305) the action "generate PDF" skill module 241 to generate a (portable document format) PDF file of the "new claim notification," and (d) triggers (line 306) the action "store document" skill module 242 to store the PDF file. When appropriate, the recommend "determine next best action" skill module 223 further (e) triggers (line 307) the recommend "estimatic option" skill module 224 to trigger (line 308) the action "offer virtual estimating" skill module 243 to automatically estimate claim damage, (f) triggers (line 309) the action "offer select service shop" skill module 244 to find and notify the insured person of select repair shops (e.g., nearby, high rating, etc.), and (g) triggers (line 310) the action "offer rental options" skill module 247 to offer a rental car to the insured person. If the insured person indicates by, for example, speaking that a rental car is needed, the observe "listen for voice activated device" module skill 215 detects the talking and triggers (line 311) the recommend "determine next best action" skill module 223, which triggers (line 312) the action "make rental reservation" skill module 236 to send a rental assignment securing a rental vehicle, which could in turn prompt scheduling for pickup of the rental car.

While an example set of skill modules 200, 210-216, 210, 220-226, 230 and 231-257 is shown in FIG. 2, skill modules instead of and/or in addition to those shown in FIG. 2 may be implemented. Other example skill modules not shown include "send photos of damage to repair shop", "order police report," "determine liability," etc.

While the example AI claim handler module 104 and/or, more generally, the example automated claim handling platform 102 are shown in FIGS. 1 and 2, one or more of the elements, processes and devices illustrated in FIGS. 1 and 2 may be combined, divided, re-arranged, omitted, eliminated or implemented in any other way. Further, the AI claim handler module 104 and/or, more generally, the automated claim handling platform 102 may include one or more elements, processes or devices in addition to, or instead of, those illustrated in FIGS. 1 and 2, or may include more than one of any or all of the illustrated elements, processes and devices.

Figure 4:
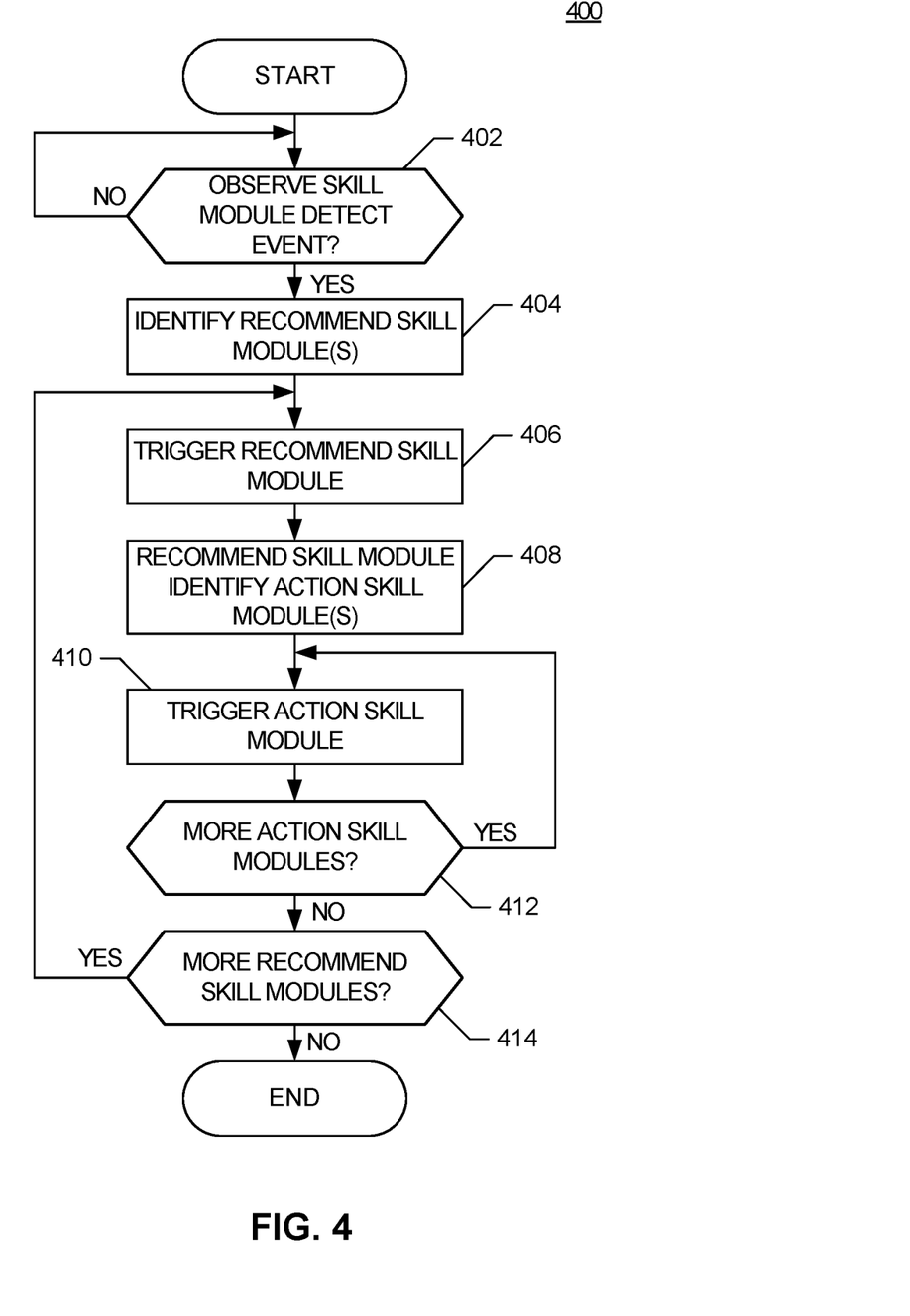
FIG. 4 is a flowchart representative of example method, hardware logic and instructions for implementing the AI claim handler module of FIG. 1, in accordance with the described embodiments.

FIG. 4 is an example flowchart 400 representative of example processes, methods, software, firmware, and computer- or machine-readable instructions for implementing the example AI claim handler modules 104 and/or, more generally, the example automated claim handling platforms 102 disclosed herein. The processes, methods, software and instructions may be an executable program or portion of an executable program for execution by a processor such as the processor 502 (see FIG. 5). The program may be embodied in software or instructions stored on a non-transitory computer- or machine-readable storage medium or disk 504 (see FIG. 5) associated with the processor 502. Further, although the example program is described with reference to the flowchart illustrated in FIG. 4, many other methods of implementing the example AI claim handler modules 104 and/or, more generally, the example automated claim handling platforms 102 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an application specific integrated circuit (ASIC), a programmable logic device (PLD), a field programmable gate array (FPGA), a field programmable logic device (FPLD), a logic circuit, etc.) structured to perform the corresponding operations without executing software or firmware. Of course, a combination of the two approaches could be used.

The example process of FIG. 4 begins with waiting for an observe skill module 210-216 to detect an event (block 402). When an event is detected (block 402), the observe skill module 210-216 identifies one or more recommend skill modules 220-226 to trigger (block 404), and triggers a first of the one or more identified recommend skill modules 220-226 (block 406). The first recommend skill module 220-226 identifies one or more action skill modules 230-257 to trigger (block 408), and triggers a first of the one or more identified action skill modules 230-257 (block 410). If there are more identified action skill modules 230-257 to trigger (block 412), control returns to block 410 to trigger a next one of the one or more identified action skill modules 230-257 (block 410). Otherwise, if there are more identified recommend skill modules 220-226 to trigger (block 414), control returns to block 406 to trigger a next one of the one or more identified recommend skill modules 220-226 (block 406). When all identified recommend skill modules 220-226 have been triggered (block 414), control exits from the example process of FIG. 4.

Figure 5:
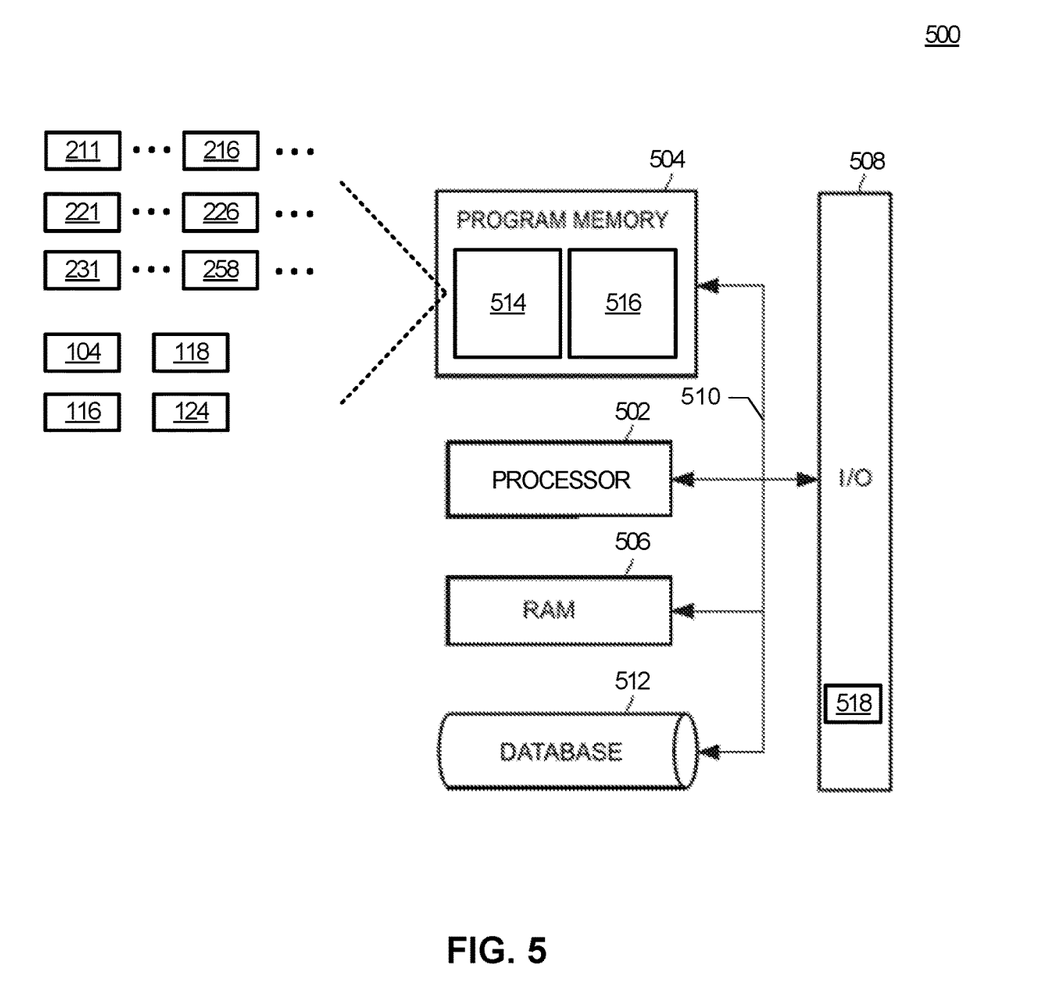
FIG. 5 is a block diagram of an example computing system that may be used to carry out the process of FIG. 4 and/or, more generally, implement the AI claim handler module of FIG. 1, in accordance with the described embodiments.

Referring now to FIG. 5, a block diagram of an example computing system 500 to process insurance claims using artificial intelligence in accordance with described embodiments. The example computing system 500 may be used to, for example, implement the automated claim handling platform 102.

The computing system 500 includes a processor 502, a program memory 504, a RAM 506, and an I/O circuit 508, all of which are interconnected via an address/data bus 510. The program memory 504 may store software, and machine- or computer-readable instructions, which may be executed by the processor 502.

It should be appreciated that although FIG. 5 depicts only one processor 502, the computing system 500 may include multiple processors 502. Example processors 502 include a programmable processor, a programmable controller, a graphics processing unit (GPU), a digital signal processor (DSP), an ASIC, a PLD, an FPGA, an FPLD, etc.

The program memory 504 may include memories, for example, one or more RAMs (e.g., a RAM 514) or one or more program memories (e.g., a ROM 516), or a cache (not shown) storing one or more corresponding software, and machine- or computer-instructions. For example, the program memory 504 stores software, and machine- or computer-readable instructions, or computer-executable instructions that may be executed by the processor 502 to implement the AI intelligence claim handler module 104, the virtual assistant module 116, the machine learning engine 118, the NLP 124, the observe skill modules 210-216, the recommend skill modules 220-226, and the action skill modules 230-257 to process insurance claims using artificial intelligence. Skill modules instead of and/or in addition to those shown in FIG. 5 may be implemented. The software, machine-readable instructions, or computer-executable instructions may be stored on separate non-transitory computer- or machine-readable storage mediums or disks, or at different physical locations.

Example memories 504, 514, 516 include any number or type(s) of volatile or non-volatile non-transitory computer- or machine-readable storage medium or disk, such as a semiconductor memories, magnetically readable memories, optically readable memories, hard disk drive (HDD), an optical storage drive, a solid-state storage device, a solid-state drive (SSD), a read-only memory (ROM), a random-access memory (RAM), a compact disc (CD), a compact disc read-only memory (CD-ROM), a digital versatile disk (DVD), a Blu-ray disk, a cache, a flash memory, or any other storage device or storage disk in which information may be stored for any duration (e.g., permanently, for an extended time period, for a brief instance, for temporarily buffering, for caching of the information, etc.).

As used herein, the term non-transitory computer-readable medium is expressly defined to include any type of computer-readable storage device and/or storage disk and to exclude propagating signals and to exclude transmission media. As used herein, the term non-transitory machine-readable medium is expressly defined to include any type of machine-readable storage device and/or storage disk and to exclude propagating signals and to exclude transmission media.

In some embodiments, the processor 502 may also include, or otherwise be communicatively connected to, a database 512 or other data storage mechanism (one or more hard disk drives, optical storage drives, solid state storage devices, CDs, CD-ROMs, DVDs, Blu-ray disks, etc.). In some examples, the database 512 stores the database 122.

Although FIG. 5 depicts the I/O circuit 508 as a single block, the I/O circuit 508 may include a number of different types of I/O circuits or components that enable the processor 502 to communicate with peripheral I/O devices. The peripheral I/O devices may be any desired type of I/O device such as the messaging module 108, the IVR/phone module 112, a keyboard, a display (a liquid crystal display (LCD), a cathode ray tube (CRT) display, touch, etc.), a navigation device (a mouse, a trackball, a capacitive touch pad, a joystick, etc.), speaker, a microphone, a button, a communication interface, an antenna, etc.

The I/O circuit 508 may include a number of different network transceivers 518 that enable the computing system 500 to communicate with another computer system, such as the backend claim handling modules 124, 126, 128, 130, and 132, and the claims database 134 via, e.g., a network (e.g., the communication network 130). The network transceiver 518 may be a Wi-Fi transceiver, a Bluetooth transceiver, an infrared transceiver, a cellular transceiver, an Ethernet network transceiver, an asynchronous transfer mode (ATM) network transceiver, a digital subscriber line (DSL) modem, a cable modem, etc.

Example methods, apparatus, and articles of manufacture to process insurance claims using AI are disclosed herein. Further examples and combinations thereof include at least the following.

Example 1 is a computer-implemented method, executed by a processor, to process an insurance claim using artificial intelligence includes interacting, with the processor, electronically with at least one of an insured person, a representative of the insured person, or a representative of an insured entity, a repair facility, or an agent to obtain information related to an insurance claim, processing, with the processor, the information with a machine learning engine to identify an action to be taken for the insurance, and performing, with the processor, the action using a backend processing module that is also used by a person to process an insurance claim.

Example 2 is the computer-implemented method of example 1, further including training the machine learning engine using information from other insurance claims.

Example 3 is the computer-implemented method of example 1 or example 2, wherein processing, with the processor, the information with the machine learning engine to identify the action includes processing previously obtained information related to the insurance claim with the machine learning engine.

Example 4 is the computer-implemented method of example 3, wherein processing, with the processor, the information with the machine learning engine to identify the action includes identifying an observed event, identifying a recommend action based on the observed event, and identifying the action based on the recommend action.

Example 5 is the computer-implemented method of example 4, wherein identifying the observed event is based on at least one of the obtained information, or other information obtained from another claim processing module of a claim processing system.

Example 6 is the computer-implemented method of any of examples 1 to 5, further including escalating, with the processor, the insurance claim to a human claim adjuster for at least one of a decision, sympathy, comfort, or difficulty providing information.

Example 7 is the computer-implemented method of any of examples 1 to 6, wherein interacting with the at least one of an insured person, a representative of the insured person, or a representative of an insured entity, a repair facility, or an agent uses humanlike interactions.

Example 8 is the computer-implemented method of any of examples 1 to 7, wherein interacting with the at least one of an insured person, a representative of the insured person, or a representative of an insured entity, a repair facility, or an agent includes at least one of a text message, a chat message, an electronic mail message, or an interactive voice response interaction.

Example 9 is the computer-implemented method of any of examples 1 to 8, wherein obtaining the information includes natural language parsing.

Example 10 is a system to process an insurance claim using artificial intelligence, the system including a virtual assistant module configured to interact electronically with at least one of an insured person, a representative of the insured person, or a representative of an insured entity to obtain information related to an insurance claim, a processor, and a memory storing machine-readable instructions that, when executed by the processor, cause the processor to process the information with a machine learning engine to identify an action to be taken for the insurance claim, and implement the action to further process the insurance claim using a backend processing module that is also used by a person to process an insurance claim.

Example 11 is the system of example 10, wherein processing the information with the machine learning engine is performed automatically without human involvement.

Example 12 is the system of example 10 or example 11, wherein processing the information with the machine learning engine includes processing previously obtained information related to the insurance claim with the machine learning engine.

Example 13 is the system of any of examples 10 to 12, wherein processing the obtained information and the previously obtained information with the machine learning engine includes identifying an observed event, identifying a recommend action based on the observed event, and identifying the action based on the recommend action.

Example 14 is the system of any of examples 10 to 13, wherein identifying the observed event is based on at least one of the obtained information, or other information obtained from another claim processing module of a claim processing system.

Example 15 is the system of any of examples 10 to 14, wherein the machine-readable instructions, when executed by the processor, cause the processor to escalate the insurance claim to a human claim adjuster for at least one of a decision, sympathy, comfort, or difficulty providing information.

Example 16 is a non-transitory computer-readable storage medium storing instructions that, when executed, cause a machine to interact electronically with at least one of an insured person, a representative of the insured person, or a representative of an insured entity to obtain information related to an insurance claim, process the information with a machine learning engine to identify an action to be taken for the insurance, and perform the action using a backend processing module that is also used by a person to process an insurance claim.

Example 17 is the non-transitory computer-readable storage medium of example 16, wherein the instructions, when executed, cause the machine to process the information together with previously obtained information related to the insurance claim with the machine learning engine to identify an observed event, identify a recommend action based on the observed event, and identify the action based on the recommend action.

Example 18 is the non-transitory computer-readable storage medium of example 16 or example 17, wherein processing the information together with previously obtained information related to the insurance claim is performed automatically without human involvement.

Example 19 is the non-transitory computer-readable storage medium of any of examples 16 to 18, wherein the instructions, when executed, cause the machine to escalate the insurance claim to a human claim adjuster for at least one of a decision, sympathy, comfort, or difficulty providing information.

Example 20 is the non-transitory computer-readable storage medium of any of examples 16 to 19, wherein the instructions, when executed, cause the machine to obtain the information using natural language parsing.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed.

As used herein, the terms "comprises," "comprising," "includes," "including," "has," "having," "containing," or any other variation thereof, are intended to cover a non-exclusive inclusion. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

As used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Unless specifically stated otherwise, "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Further, in this document, relational terms such as first and second, top and bottom, and the like may be used solely to distinguish one entity or action from another entity or action without necessarily requiring or implying any actual such relationship or order between such entities or actions.

Further still, unless expressly stated to the contrary, "or" refers to an inclusive or and not to an exclusive or. For example, A, B or C refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to implementations including any of (1) at least one A, (2) at least one B, and (3) at least one A and at least one B. Similarly, the phrase "at least one of A or B" is intended to refer to implementations including any of (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

Finally, unless a claim element is defined by reciting the word "means" and a function without the recital of any structure, it is not intended that the scope of any claim element be interpreted based on the application of 35 U.S.C. § 112, sixth paragraph.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computer-implemented method, comprising:
    receiving, by a processor, first input data identifying an insurance claim;
    determining, by the processor and based on the first input data, a claim type associated with the insurance claim;
    receiving, by the processor, a voice input from a user device;
    generating, by the processor inputting the voice input into a natural language parser, second input data related to at least one incomplete step of the insurance claim;
    invoking, by the processor, a first machine learning model configured to:
        identify, based at least in part on the second input data, an observed event associated with the insurance claim; and
        select, based on the observed event, a second machine learning model trained to identify an action from a plurality of actions;
    invoking, by the processor, the second machine learning model, wherein:
        the second machine learning model is a neural network, and the processor trains the second machine learning model using supervised learning based on training data comprising:
            sets of known values, each set of known values corresponding to a respective previously-processed insurance claim, and identifying a particular claim type characterizing the respective previously-processed insurance claim, and
            for each of the previously-processed insurance claims, an indication of an action performed,
        invoking the second machine learning model comprises providing the second input data and the claim type to the second machine learning model, and receiving output data generated by the second machine learning model based on the second input data and the claim type, and
        the output data indicates a next action to be performed to process the insurance claim, the next action identifying information required by the at least one incomplete step of the insurance claim;
    selecting, by the processor, a third machine learning model from a plurality of trained machine learning models, the third machine learning model being trained to perform the next action;
    determining, by the processor, a confidence level associated with the performance of the next action by the third machine learning model;
    invoking, by the processor and based on the confidence level being greater than a threshold, the third machine learning model to perform the next action using the second input data as input; and
    updating, the second machine learning model, wherein the updating comprises training the second machine learning model based on the second input data and the performance of the next action by the third machine learning model.

2. The computer-implemented method of claim 1, wherein identifying the observed event is based on the second input data and other information related to the insurance claim previously stored in a claim processing system.

3. The computer-implemented method of claim 1, further comprising:
    escalating, by the processor and based on the confidence level being less than the threshold, the insurance claim to a human claim adjuster for decision making associated with the insurance claim.

4. The computer-implemented method of claim 1, wherein the user device is a first user device, the method further comprising:
    receiving, by the processor, a third input data from a second user device via at least one of a text message, a chat message, an electronic mail message, or an interactive voice response interaction, the method further comprising:
    invoking, by the processor, the updated second machine learning model by providing the third input data and the claim type to the updated second machine learning model; and
    receiving, by the processor and as output from the updated second machine learning model, a next action to be performed to process the insurance claim.

5. The computer-implemented method of claim 1, further comprising performing natural language parsing on the first input data.

6. The computer-implemented method of claim 1, wherein the third machine learning model is configured to output a liability determination based at least in part on (a) the claim type associated with the insurance claim and (b) the second input data.

7. The computer-implemented method of claim 1, wherein invoking the third machine learning model comprises providing, as input to the third machine learning model, a vector based on a plurality of data associated with the insurance claim in the claim processing system.

8. The computer-implemented method of claim 1, wherein the next action comprises initiating a third-party interaction to perform a repair or offer a rental associated with the insurance claim.

9. The computer-implemented method of claim 1, wherein the next action comprises initiating an interaction with the user device with instructions to capture photos of damaged property associated with the insurance claim.

10. The computer-implemented method of claim 1, further comprising:
  establishing, via a communication network, a connection between the processor and a user device; and
  sending, by the processor and via the connection, information related to the insurance claim to the user device, the information corresponding to the next action performed by the processor.

11. The computer-implemented method of claim 1, wherein:
  the first input data is received from a user of the user device, the user comprising an insurance agent, an insured person, or a representative of the insured person; and
  the user device comprises a tablet, a smartphone, or a computer.

12. The computer-implemented method of claim 1, wherein the next action comprises generating a settlement offer or initiating payment.

13. A system comprising:
  a processor; and
  a memory storing machine-readable instructions that, when executed by the processor, cause the processor to:
    receive first input data identifying an insurance claim in a claim processing system;
    determine, based on the first input data, a claim type associated with the insurance claim;
    receive, from a user device, a voice input;
    determine, based on inputting the voice input to a natural language parser, second input data related to at least one incomplete step of the insurance claim;
    invoke a first machine learning model configured to:
      identify, based at least in part on the second input data, an observed event associated with the insurance claim; and
      select, based on the observed event, a second machine learning model trained to identify an action from a plurality of actions;
    invoke the second machine learning model, wherein:
      the second machine learning model is a neural network, and the processor trains the second machine learning model using supervised learning based on training data comprising:
        sets of known values, each set of known values corresponding to a respective previously-processed insurance claim, and identifying a particular claim type characterizing the respective previously-processed insurance claim, and
        for each of the previously-processed insurance claims, an indication of an action performed,
      invoking the second machine learning model comprises providing the second input data and the claim type to the second machine learning model, and receiving output data generated by the second machine learning model based on the second input data and the claim type, and
      the output data indicates a next action to be performed to process the insurance claim, the next action identifying information required by the at least one incomplete step of the insurance claim;
    select a third machine learning model from a plurality of trained machine learning models, the third machine learning model being trained to perform the next action;
    determine a confidence level associated with the performance of the next action by the third machine learning model;
    invoke, based on the confidence level being greater than a threshold, the third machine learning model to perform the next action using the second input data as input; and
    update, the second machine learning model, wherein the updating comprises training the second machine learning model based on the second input data and performance of the next action by the third-machine learning model.

14. The system of claim 13, wherein invoking the first and second machine learning models is performed automatically without human involvement.

15. The system of claim 13, wherein the machine-readable instructions further cause the processor to send information to the user device, the information including responses to questions received from the user device, or a document request.

16. A non-transitory computer-readable storage medium comprising instructions that, when executed, cause a processor to:
  receive first input data identifying an insurance claim in a claim processing system;
  determine, based on the first input data, a claim type associated with the insurance claim;
  receive, from a user device, a voice input;
  determine, based on inputting the voice input to a natural language parser, second input data related to at least one incomplete step of the insurance claim;
  invoke a first machine learning model configured to:
    identify, based at least in part on the second input data, an observed event associated with the insurance claim; and
    select, based on the observed event, a second machine learning model trained to identify an action from a plurality of actions;
  invoke the second machine learning model, wherein:
    the second machine learning model is a neural network, and the processor trains the second machine learning model using supervised learning based on training data comprising:
      sets of known values, each set of known values corresponding to a respective previously-processed insurance claim, and identifying a particular claim type characterizing the respective previously-processed insurance claim, and
      for each of the previously-processed insurance claims, an indication of an action performed,
    invoking the second machine learning model comprises providing the second input data and the claim type to the second machine learning model, and receiving output data generated by the second machine learning model based on the second input data and the claim type, and
    the output data indicates a next action to be performed to process the insurance claim, the next action identifying information required by the at least one incomplete step of the insurance claim;
  select a third machine learning model from a plurality of trained machine learning models, the third machine learning model being trained to perform the next action;
  determine a confidence level associated with the performance of the next action by the third machine learning model;
  invoke, based on the confidence level being greater than a threshold, the third machine learning model to perform the next action using the second input data as input; and update, the second machine learning model, wherein the updating comprises training the second machine learning model based on the second input data and performance of the next action by the third machine learning model.

17. The non-transitory computer-readable storage medium of claim 16, wherein the instructions, when executed, cause information related to the insurance claim to be sent to the user device, the information corresponding to the next action performed by the processor.

\* \* \* \* \*